United States Patent
Bleiweiss

(10) Patent No.: US 12,205,007 B2
(45) Date of Patent: Jan. 21, 2025

(54) METHODS, SYSTEMS, ARTICLES OF MANUFACTURE, AND APPARATUS TO OPTIMIZE LAYERS OF A MACHINE LEARNING MODEL FOR A TARGET HARDWARE PLATFORM

(71) Applicant: Intel Corporation, Santa Clara, CA (US)

(72) Inventor: Amit Bleiweiss, Yad Binyamin D (IL)

(73) Assignee: Intel Corporation, Santa Clara, CA (US)

( * ) Notice: Subject to any disclaimer, the term of this patent is extended or adjusted under 35 U.S.C. 154(b) by 470 days.

(21) Appl. No.: 16/914,245

(22) Filed: Jun. 26, 2020

(65) Prior Publication Data

US 2020/0327392 A1    Oct. 15, 2020

(51) Int. Cl.
*G06N 3/04* (2023.01)
*G06N 3/06* (2006.01)
*G06N 3/08* (2023.01)
*G06N 3/10* (2006.01)

(52) U.S. Cl.
CPC .......... *G06N 3/04* (2013.01); *G06N 3/06* (2013.01); *G06N 3/08* (2013.01); *G06N 3/10* (2013.01); *G05B 2219/33021* (2013.01); *G05B 2219/33027* (2013.01)

(58) Field of Classification Search
None
See application file for complete search history.

(56) References Cited

U.S. PATENT DOCUMENTS

| | | | |
|---|---|---|---|
| 10,635,972 B1* | 4/2020 | Le | G06N 3/08 |
| 2008/0319933 A1* | 12/2008 | Moussa | G06N 3/084 |
| | | | 706/31 |
| 2018/0293486 A1* | 10/2018 | Bajic | G06N 3/084 |
| 2019/0122110 A1* | 4/2019 | Ruckauer | G06N 3/04 |
| 2019/0236436 A1* | 8/2019 | Imber | G06N 3/04 |
| 2019/0244091 A1* | 8/2019 | Weber | G06N 3/08 |
| 2019/0303761 A1* | 10/2019 | Bengio | G06N 3/0445 |
| 2019/0370643 A1* | 12/2019 | Aflalo | G06F 9/5044 |
| 2023/0140634 A1* | 5/2023 | Pereira Gonçalves | G06N 3/02 |
| | | | 382/128 |

OTHER PUBLICATIONS

Zoph, Barret & Vasudevan, Vijay & Shlens, Jonathon & Le, Quoc, "Learning Transferable Architectures for Scalable Image Recognition," Apr. 2018, 8697-8710. 10.1109/CVPR.2018.00907, 14 pages.

(Continued)

*Primary Examiner* — Umut Onat
(74) *Attorney, Agent, or Firm* — Hanley, Flight & Zimmerman, LLC

(57) ABSTRACT

Methods, apparatus, systems, and articles of manufacture are disclosed that optimize layers of a machine learning model for a target hardware platform. An example apparatus includes a communication processor to obtain information specific to the target hardware platform (THP) on which to execute the machine learning model; a layer generation controller to generate layers of the machine learning model based on the information specific to the THP; and a deployment controller to, in response to the machine learning model satisfying a threshold error metric, deploy the machine learning model to the THP.

21 Claims, 9 Drawing Sheets

(56) References Cited

OTHER PUBLICATIONS

Cai, Han et al. "ProxylessNAS: Direct Neural Architecture Search on Target Task and Hardware." ArXiv abs/1812.00332, Feb. 23, 2019, 13 pages.

Wang, Chi-Feng, "A Basic Introduction to Separable Convolutions," Towards Data Science, Aug. 13, 2018, 15 pages.

Github, "mlperf/inference_results_v0.5," available online, last retrieved May 17, 2020 from inference_results_v0.5/closed/Habana/code/ssd-large/Habana_benchmark at master •mlperf/inference_results_v0.5—GitHub, 7 pages.

Hruska, Joel, "Intel Details Its Nervana Inference and Training AI Cards, " Extreme Tech, Aug. 21, 2019, 13 pages.

Krizhevsky et al., "ImageNet Classification with Deep Convolutional Neural Networks," NeurIPS Proceedings, Advances in Neural Information Processing Systems 25 (NIPS 2012), 2012, 10 pages.

Zhang et al., "Optimized Compression for Implementing Convolutional Neural Networks on FPGA," MDPI, Electronics 2019, 8, 295, Mar. 6, 2019, 15 pages.

* cited by examiner

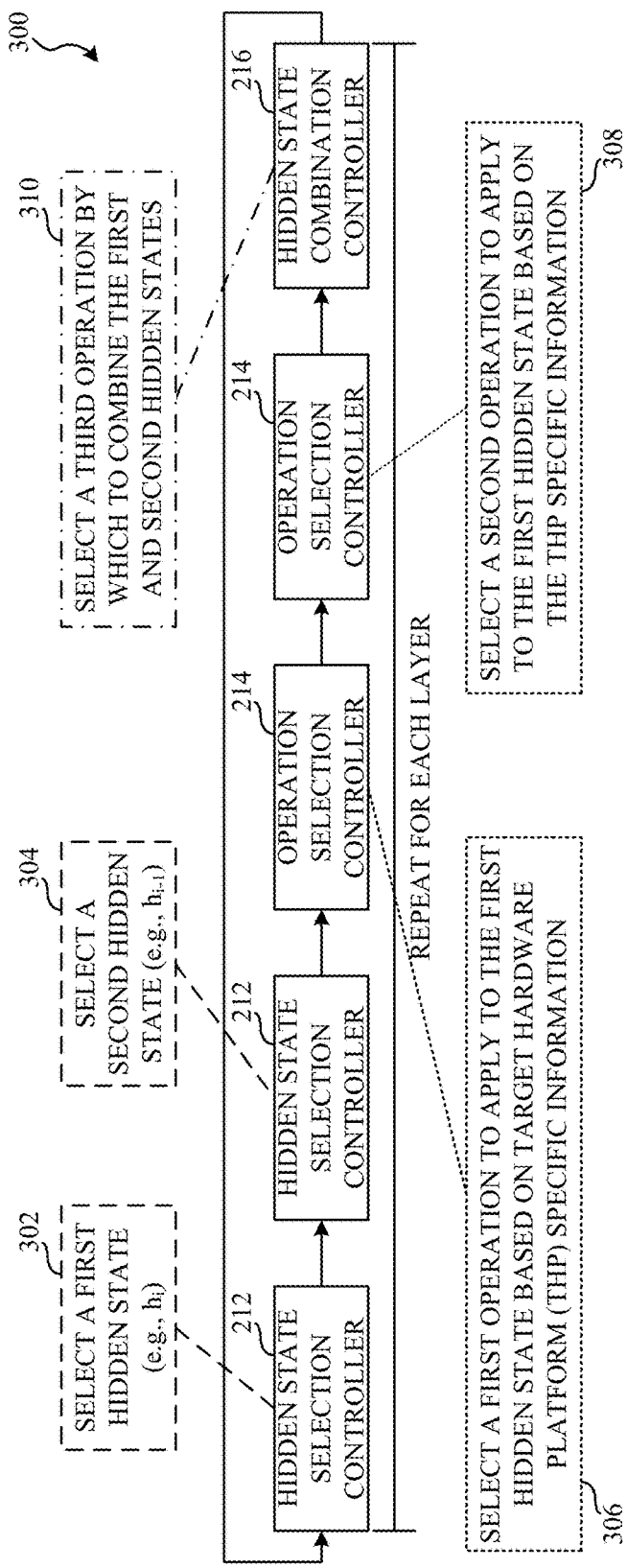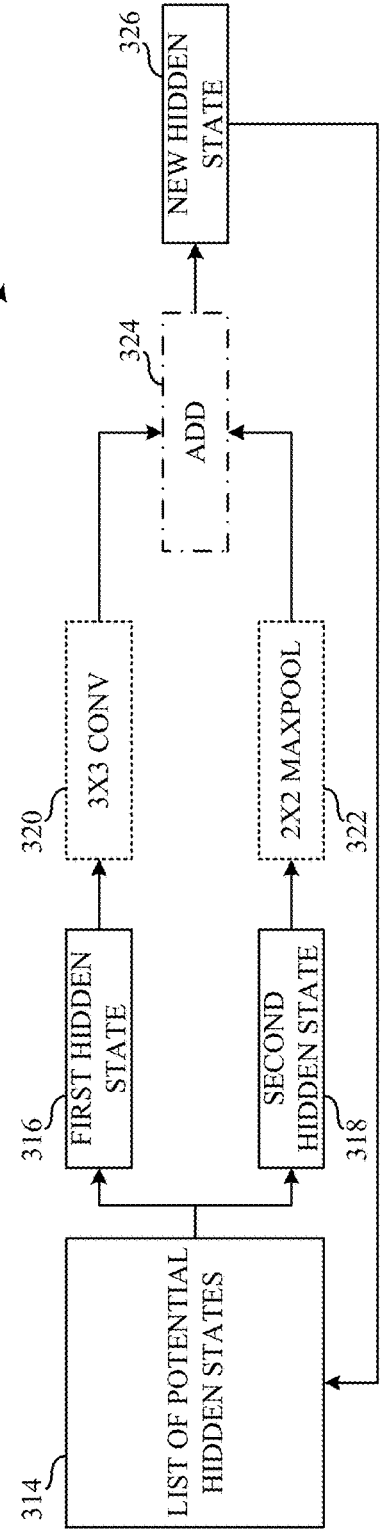
FIG. 3A
FIG. 3B

METHODS, SYSTEMS, ARTICLES OF MANUFACTURE, AND APPARATUS TO OPTIMIZE LAYERS OF A MACHINE LEARNING MODEL FOR A TARGET HARDWARE PLATFORM

FIELD OF THE DISCLOSURE

This disclosure relates generally to artificial intelligence, and, more particularly, to methods, systems, articles of manufacture, and apparatus to optimize layers of a machine learning model for a target hardware platform.

BACKGROUND

Machine learning models, such as neural networks, are useful tools that have demonstrated their value solving complex problems regarding pattern recognition, natural language processing, automatic speech recognition, etc. Neural networks operate, for example, using artificial neurons arranged into layers that process data from an input layer to an output layer, applying weighting values to the data during the processing of the data. Such weighting values are determined during a training process.

BRIEF DESCRIPTION OF THE DRAWINGS

FIG. 3A is a visual representation of the processes executed by the example model training controller of FIG. 1 to generate layers of a machine learning model.

FIG. 3B is an example illustration of the processes of FIG. 3A.

Figure 1:
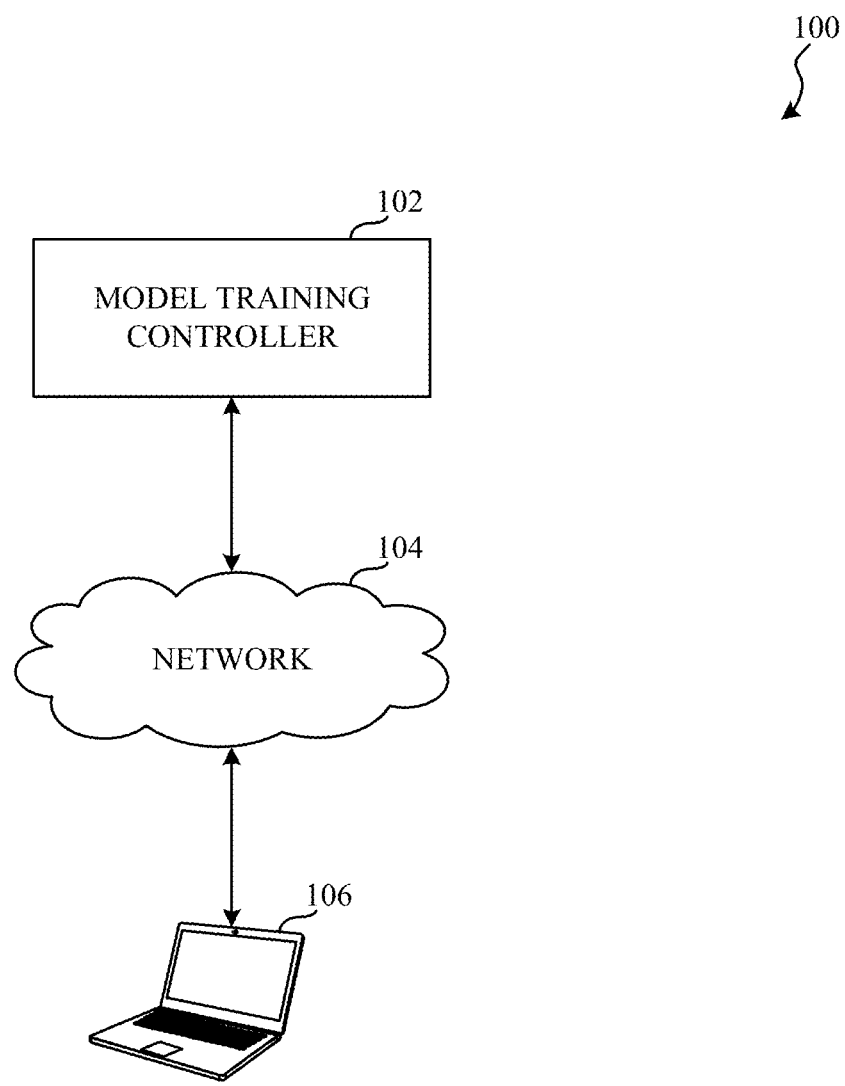
FIG. 1 is an illustration of an example environment including an example model training controller.

The figures are not to scale. In general, the same reference numbers will be used throughout the drawing(s) and accompanying written description to refer to the same or like parts. As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other.

Unless specifically stated otherwise, descriptors such as "first," "second," "third," etc. are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

DETAILED DESCRIPTION

Artificial intelligence (AI), including machine learning (ML), deep learning (DL), and/or other artificial machine-driven logic, enables machines (e.g., computers, logic circuits, etc.) to use a model to process input data to generate an output based on patterns and/or associations previously learned by the model via a training process. For instance, the model may be trained with data to recognize patterns and/or associations and follow such patterns and/or associations when processing input data such that other input(s) result in output(s) consistent with the recognized patterns and/or associations.

In general, implementing a ML/AI system involves at least two phases, a learning/training phase and an inference phase. In the learning/training phase, a training algorithm is used to train a model to operate in accordance with patterns and/or associations based on, for example, training data. In general, the model includes internal parameters that guide how input data is transformed into output data, such as through a series of nodes and connections within the model to transform input data into output data. Additionally, hyperparameters are used as part of the training process to control how the learning is performed (e.g., a learning rate, a number of layers to be used in the machine learning model, etc.). Hyperparameters are defined to be training parameters that are determined prior to initiating the training process.

Different types of training may be performed based on the type of ML/AI model and/or the expected output. For example, supervised training uses inputs and corresponding expected (e.g., labeled) outputs to select parameters (e.g., by iterating over combinations of select parameters) for the ML/AI model that reduce model error. As used herein, labelling refers to an expected output of the machine learning model (e.g., a classification, an expected output value, etc.). Alternatively, unsupervised training (e.g., used in deep learning, a subset of machine learning, etc.) involves inferring patterns from inputs to select parameters for the ML/AI model (e.g., without the benefit of expected (e.g., labeled) outputs).

Once training is complete, the model is deployed for use as an executable construct that processes an input and provides an output based on the network of nodes and connections defined in the model. Once trained, the deployed model may be operated in an inference phase to process data. In the inference phase, data to be analyzed (e.g., live data) is input to the model, and the model executes to create an output. This inference phase can be thought of as the AI "thinking" to generate the output based on what it learned from the training (e.g., by executing the model to apply the learned patterns and/or associations to the live data). In some examples, input data undergoes pre-processing before being used as an input to the machine learning model. Moreover, in some examples, the output data may undergo post-processing after it is generated by the AI model to transform the output into a useful result (e.g., a display of data, an instruction to be executed by a machine, etc.).

In some examples, the output of the deployed model may be captured and provided as feedback. By analyzing the feedback, an accuracy of the deployed model can be determined. If the feedback indicates that the accuracy of the deployed model is less than a threshold or other criterion, training of an updated model can be triggered using the feedback and an updated training data set, hyperparameters, etc., to generate an updated, deployed model.

Under the current paradigm in machine learning, neural networks models are inherently based on the hardware platform at which they are trained. As a result, the building blocks (e.g., functions) and layers are highly tuned to the architecture of the training hardware platform. This link to the training hardware platform affects the performance of trained models during the inference.

For example, if a model was trained on a graphics processing unit (GPU), then when the model executes with non-GPU architectures and/or accelerators that do not necessarily optimally support GPU operators, the model will not perform at an equivalent level. Prior approaches attempt to solve this issue by finding optimal topologies of a model for a specific accuracy. For example, prior approaches have tried to find an optimal topology for models that can achieve state of the art accuracy on the ImageNet challenge. While previous approaches have lowered multiply and accumulate (MAC) operations within an acceptable accuracy, the underlying building blocks and layers of the model are natively optimized for the training hardware platform. As such, the models determined by previous techniques are not optimal on other accelerators. For example, a 7×7 depth-wise-separable convolution may perform acceptably on a GPU, but such an operation is typically far from optimal on most AI accelerators.

Other techniques have added latency to the cost functions of models by adding a prediction estimate per layer based on the device. However, the underlying layers are still the same base layers influenced by a training algorithm. Under such techniques, models vary between devices. For example, a model targeted at a GPU will be a shallow, wide model, whereas a model targeted for a mobile device will be deeper. As used herein, a shallow model refers to a machine learning model that includes a relatively fewer number of layers (e.g., a relatively small number of layers, shallow, etc.). As used herein, a wide model refers to a machine learning model that includes a relatively greater number of nodes (e.g., hundreds, thousands, etc.) in hidden layers. As used herein, a deep model refers to a machine learning model that includes a relatively greater number of layers (e.g., hundreds, thousands, etc.). However, regardless of the targeted device, the model implements the same building blocks and layers that were developed on the training hardware platform. These building blocks and layers are inherently non-optimal on hardware platforms that do not correspond to the training platform.

Examples disclosed herein solve this issue by encoding the target hardware specific information during the training process, such that the resultant topology of the model is fine-tuned and/or otherwise tailored for a specific target hardware platform. Previous techniques optimize the existing building blocks and layers of a machine learning model for a target hardware. However, the building blocks and layers of these previous techniques are optimized for the training hardware platform. Contrary to previous techniques, examples disclosed herein generate optimal building blocks and optimal layers for a target hardware architecture at which the model is to be deployed. Examples disclosed herein generate a new hardware-optimized model (e.g., a neural network) for a given problem (e.g., object recognition), such the that layers of the model (e.g., the neural network) are optimized for the specific target hardware platform.

FIG. 1 is an illustration of an example environment 100 including an example model training controller 102. The example environment 100 includes the example model training controller 102, an example network 104, and an example target hardware platform 106. In the example of FIG. 1, the example model training controller 102, the example target hardware platform 106, and/or one or more additional devices are communicatively coupled via the example network 104.

In the illustrated example of FIG. 1, the model training controller 102 is implemented by one or more controllers. In additional or alternative examples, the model training controller 102 can be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). In the example of FIG. 1, the model training controller 102 is one or more controllers that implement a recurrent neural network (RNN) (e.g., a parent model) to train one or more child models based on information specific to a target hardware platform. In additional or alternative examples, the model training controller 102 can implement any other ML/AI model.

In the illustrated example of FIG. 1, the model training controller 102 builds child models (e.g., child networks) based on pre-designed building blocks and layers (e.g., Normal Layers, Reduction Layers, Slice Layers, etc.). In examples disclosed herein, the model training controller 102 buildings child models (e.g., child networks) including Normal Layers, Reduction Layers, and Slice Layers. Normal layers include a convolution that generates a feature map of the same dimension as the input. Reduction layers include a convolution that generates a features map which is half the size of the input. Slice layers include one or more slice operations to divide input data to the child model into partitions that are suitable for memory at the target hardware platform. While the normal layers, reduction layers, and slice layers include convolutions and slice operations, the model training controller 102 generates the internal representation of these layers (e.g., the type of convolution, the type of slice operation, etc.) based on information specific to the target hardware platform. As such, while the type of layer is pre-designed (e.g., normal, reduction, slice, etc.), in examples disclosed herein, the various operations executed therein are tuned to a target hardware platform.

Thus, the example layers and building blocks disclosed herein are predicated on operators that are optimized for a given target hardware platform. The example model training controller 102 implements a latency estimator that is specific to a target hardware platform. The example latency estimator is included in the cost function of the controller RNN network (e.g., parent model) to ensure the resultant child model (e.g., child network) is optimized (e.g., performs within a threshold of a benchmark) for performance as well as accuracy on the target hardware platform. In examples disclosed herein, the latency estimator can be implemented as the sum of the products of a set of weights and corresponding set of latencies for a set of operations (e.g., convolutions, max pooling, identity operations, etc.).

In the illustrated example of FIG. 1, the model training controller 102 can offer one or more services and/or products to end-users. For example, the model training controller 102 can provide one or more trained models for download, host a web-interface, among others. In some examples, the model training controller 102 can provide end-users with a training plugin which implements the functionality of the model training controller 102. In this manner, the end-user can implement the model training controller 102 locally (e.g., at the target hardware platform 106).

In some examples, the example model training controller 102 implements example means for training machine learning models. The machine learning model training means is implemented by executable instructions such as that implemented by at least blocks 602, 604, 606, 608, 610, and 612 of FIG. 6 and/or at least blocks 702, 704, 706, 708, 710, 712, 714, 716, 718, and 720 of FIG. 7. The executable instructions of blocks 602, 606, 608, 610, and 612 of FIG. 6 and/or blocks 702, 704, 706, 708, 710, 712, 714, 716, 718, and 720 of FIG. 7 may be executed on at least one processor such as the example processor 812 of FIG. 8. In other examples, the machine learning model training means is implemented by hardware logic, hardware implemented state machines, logic circuitry, and/or any other combination of hardware, software, and/or firmware.

In the illustrated example of FIG. 1, the network 104 is the Internet. However, the example network 104 may be implemented using any suitable wired and/or wireless network(s) including, for example, one or more data buses, one or more Local Area Networks (LANs), one or more wireless LANs, one or more cellular networks, one or more private networks, one or more public networks, etc. In additional or alternative examples, the network 104 is an enterprise network (e.g., within businesses, corporations, etc.), a home network, among others. The example network 104 enables the model training controller 102 and the target hardware platform 106 to communicate. As used herein, the phrase "in communication," including variances thereof (e.g., communicate, communicatively coupled, etc.), encompasses direct communication and/or indirect communication through one or more intermediary components and does not require direct physical (e.g., wired) communication and/or constant communication, but rather includes selective communication at periodic or aperiodic intervals, as well as one-time events.

In the illustrated example of FIG. 1, the target hardware platform 106 is implemented by a laptop computer including an AI accelerator where the AI accelerator is the target hardware platform. In additional or alternative examples, the target hardware platform 106 can be implemented by a mobile phone, a tablet computer, a desktop computer, a server, among others including one or more analog or digital circuit(s), logic circuits, programmable processor(s), programmable controller(s), GPU(s), DSP(s), ASIC(s), PLD(s) and/or FPLD(s). The target hardware platform 106 can additionally or alternatively be implemented by a CPU, GPU, an accelerator, a heterogeneous system, among others.

In the illustrated example of FIG. 1, the target hardware platform 106 can subscribe to and/or otherwise purchase from the model training controller 102 to access a trained machine learning model that is optimized for the target hardware platform 106. For example, the target hardware platform 106 can access the trained model by downloading the model from the model training controller 102, accessing a web-interface hosted by the model training controller 102 and/or another device, among other techniques. In some examples, the target hardware platform 106 can install a plugin to a machine learning training application. In such an example, the plugin implements the model training controller 102.

Figure 2:
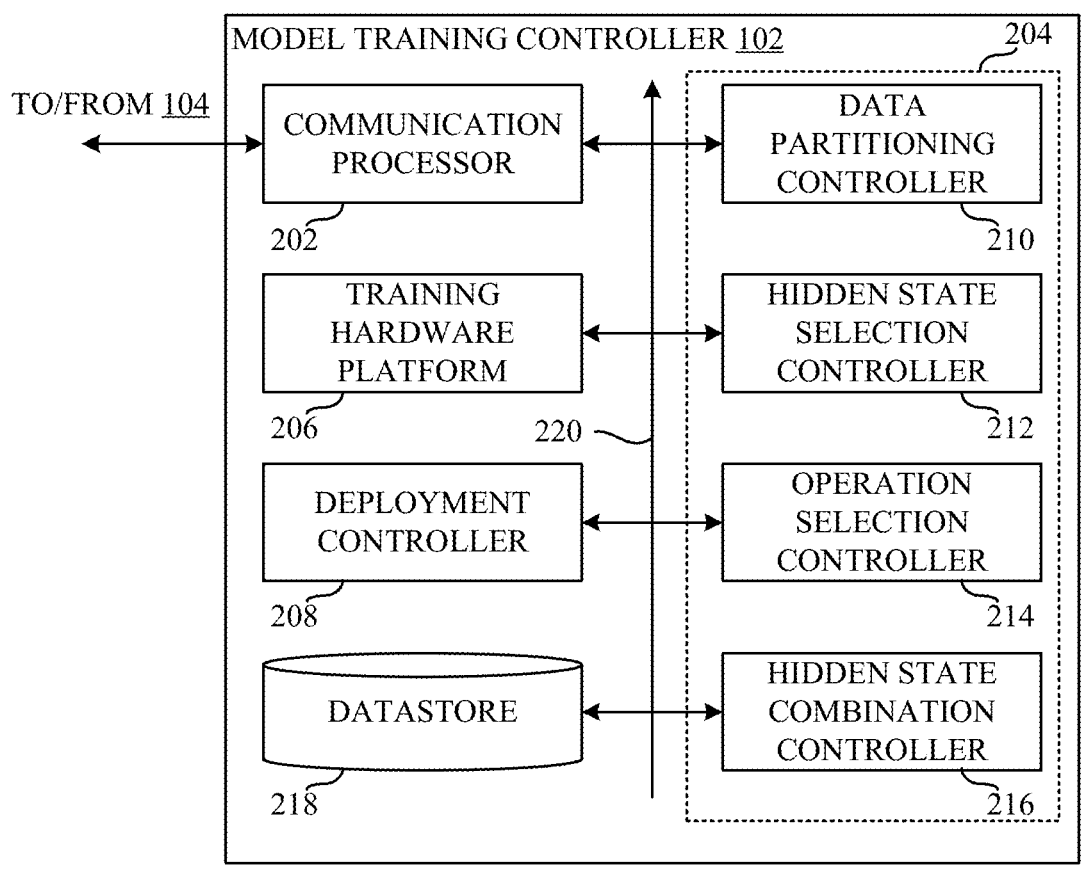
FIG. 2 is a block diagram showing example detail of the example model training controller of FIG. 1.

FIG. 2 is a block diagram showing example detail of the example model training controller 102 of FIG. 1. The model training controller 102 includes an example communication processor 202, an example layer generation controller 204, an example training hardware platform 206, an example deployment controller 208. The example layer generation controller 204 includes an example data partitioning controller 210, an example hidden state selection controller 212, an example operation selection controller 214, and an example hidden state combination controller 216. The model training controller 102 additionally includes an example datastore 218. In the example of FIG. 2, any of the communication processor 202, the layer generation controller 204, the training hardware platform 206, the deployment controller 208, the data partitioning controller 210, the hidden state selection controller 212, the operation selection controller 214, the hidden state combination controller 216, and/or the datastore 218 can communicate via an example communication bus 220.

In examples disclosed herein, the communication bus 220 may be implemented using any suitable wired and/or wireless communication. In additional or alternative examples, the communication bus 220 includes software, machine readable instructions, and/or communication protocols by which information is communicated among the communication processor 202, the layer generation controller 204, the training hardware platform 206, the deployment controller 208, the data partitioning controller 210, the hidden state selection controller 212, the operation selection controller 214, the hidden state combination controller 216, and/or the datastore 218.

In examples disclosed herein, the model training controller 102 trains one or more child models (e.g., child neural networks) based on information specific to a target hardware platform. Many different types of machine learning models and/or machine learning architectures exist. In examples disclosed herein, the model training controller 102 implements at least an RNN model to train CNN models. Using an RNN model enables recursive prediction of child architectures. In general, machine learning models/architectures that are suitable to use in the example approaches disclosed herein will be neural networks. However, other types of machine learning models could additionally or alternatively be used, including, but not limited to random forests, decision trees, among others.

In the illustrated example of FIG. 2, the communication processor 202 is implemented by a network interface controller. In additional or alternative examples, the communication processor 202 can be implemented by one or more analog or digital circuit(s), logic circuits, programmable processor(s), programmable controller(s), GPU(s), DSP(s), ASIC(s), PLD(s) and/or FPLD(s). The example communication processor 202 functions as a network interface structured to communicate with other devices in a network (e.g., the network 104) with a designated physical and data link layer standard (e.g., Ethernet or Wi-Fi). For example, the communication processor 202 can obtain information specific to one or more target hardware platforms at which to execute one or more trained models.

In examples disclosed herein, information specific to a target hardware platform (THP), sometimes referred to as THP specific information, includes operators (e.g., functions, operations, etc.) that are conditioned for the target hardware platform, kernels that are optimized for the target hardware platform, a latency estimator that is specific to the target hardware platform, memory capabilities of the target hardware platform, memory bandwidth of the target hardware platform, among others. The example communication processor 202 of FIG. 1 additionally obtains a target task on which the child model (e.g., child network) to be trained is to operate, as well as one or more training datasets.

In some examples, the communication processor 202 implements example means for processing communications. The communication processing means is implemented by executable instructions such as that implemented by at least blocks 602 and 604 of FIG. 6. The executable instructions of blocks 602 and 604 of FIG. 6 may be executed on at least one processor such as the example processor 812 of FIG. 8. In other examples, the communication processing means is implemented by hardware logic, hardware implemented state machines, logic circuitry, and/or any other combination of hardware, software, and/or firmware.

In the illustrated example of FIG. 2, the layer generation controller 204 is implemented by one or more controllers. In additional or alternative examples, the layer generation controller 204 can be implemented by one or more analog or digital circuit(s), logic circuits, programmable processor(s), programmable controller(s), GPU(s), DSP(s), ASIC(s), PLD(s) and/or FPLD(s). The example layer generation controller 204 generates layers of a child machine learning model (e.g., the child model, the child network, etc.) based on THP specific information.

By generating layers of a child machine learning model based on THP specific information, examples disclosed herein achieve greater performance on target hardware platforms than previous techniques. For example, while some previous techniques added latency to the cost function by adding a prediction estimate per layer based on a target device, the underlying layers are still the same base layers influenced by the training hardware platform at which the machine learning models were trained. As such, despite generating differing models for a GPU versus a mobile device (as discussed above), these models implement the same layer options, which are not optimal on hardware platforms different than the training hardware platform. Contrary to previous techniques, examples disclosed herein utilize optimal layers (e.g., layers that perform within a threshold of a benchmark) for a target hardware architecture, rather than optimizing the model after the fact for that respective hardware using layers that have been optimized for a training hardware platform that is different than the target hardware platform.

In some examples, the layer generation controller 204 implements example means for generating layers of a machine learning model. The machine learning model layer generation means is implemented by executable instructions such as that implemented by at least block 606 of FIG. 6 and/or at least blocks 702, 704, 706, 708, 710, 712, 714, 716, 718, and/or 720 of FIG. 7. The executable instructions of block 606 of FIG. 6 and/or blocks 702, 704, 706, 708, 710, 712, 714, 716, 718, and/or 720 of FIG. 7 may be executed on at least one processor such as the example processor 812 of FIG. 8. In other examples, the machine learning model layer generation means is implemented by hardware logic, hardware implemented state machines, logic circuitry, and/or any other combination of hardware, software, and/or firmware.

In the illustrated example of FIG. 2, the training hardware platform 206 is implemented by one or more computing devices. For example, the training hardware platform 206 can be implemented by one or more analog or digital circuit(s), logic circuits, programmable processor(s), programmable controller(s), GPU(s), DSP(s), ASIC(s), PLD(s) and/or FPLD(s). In some examples, the training hardware platform 206 can additionally or alternatively be implemented by one or more vision processing units (VPUs) and/or one or more AI accelerators. The training hardware platform 206 executes the machine learning model in accordance with patterns and/or associations based on a training dataset.

In examples disclosed herein, the training hardware platform 206 can be a similar hardware platform (e.g., same model, same type of accelerator, etc.) as the target hardware platform 106, or the training hardware platform 206 can be entirely different (e.g., e.g., different acceleration, a GPU versus a CPU, etc.) than the target hardware platform 106. In either case, the layer generation controller 204 generates particular layers for the target hardware platform 106 due to the collection and incorporation of the THP specific information. As used herein, particular layers, sometimes referred to as optimal layers, are tailored or otherwise based on THP specific information. As such, examples disclosed herein generate particular building blocks and particular layers for a target hardware architecture at which an individual desires to deploy the model regardless of the training hardware platform 206.

In some examples, the training hardware platform 206 implements example means for executing a machine learning model. The machine learning model execution means is implemented by executable instructions such as that implemented by at least block 608 of FIG. 6. The executable instructions of block 608 of FIG. 6 may be executed on at least one processor such as the example processor 812 of FIG. 8. In other examples, the machine learning model execution means is implemented by hardware logic, hardware implemented state machines, logic circuitry, and/or any other combination of hardware, software, and/or firmware.

In the illustrated example of FIG. 2, the deployment controller 208 is implemented by a controller. In additional or alternative examples, the deployment controller 208 can be implemented by one or more analog or digital circuit(s), logic circuits, programmable processor(s), programmable controller(s), GPU(s), DSP(s), ASIC(s), PLD(s) and/or FPLD(s). The example deployment controller 208 facilitates training of the child machine learning model, determines whether the child machine learning model is sufficiently trained, and/or deploys the child machine learning model to the target hardware platform 106.

In examples disclosed herein, ML/AI models are trained using standard gradient descent. However, any other training algorithm may additionally or alternatively be used. In examples disclosed herein, training is performed until a target error metric is satisfied by the child model (e.g., child network). In examples disclosed herein, training is performed at the model training controller 102. However, as discussed, in some examples the target hardware platform 106 may download a plugin to facilitate training at the target hardware platform 106. Training is performed using hyperparameters that control how the learning is performed (e.g., a learning rate, a number of layers to be used in the machine learning model, etc.). In examples disclosed herein, hyperparameters that control number of layers of the child model (e.g., child network) are used. Such hyperparameters are selected by, for example, by an individual in charge of overseeing the training of the child model (e.g., child network). In some examples re-training may be performed. Such re-training may be performed in response to the child model (e.g., child network) no longer satisfying the target error metric.

Training is performed using training data. In examples disclosed herein, the training data originates from known challenge sets. For example, the training data may be the ImageNet dataset, the CIFAR-10 dataset, among others. Examples disclosed herein implement reinforcement learning. Once training is complete, the model is deployed for use as an executable construct that processes an input and provides an output based on the network of nodes and connections defined in the model. The model is stored at the target hardware platform 106. The model may then be executed by the target hardware platform 106. In some examples, the model (e.g., the child network) can be stored at the datastore 218 for later deployment.

In some examples, the deployment controller 208 implements example means for deploying machine learning models. The machine learning model deployment means is implemented by executable instructions such as that implemented by at least blocks 610 and 612 of FIG. 6. The executable instructions of blocks 610 and 612 of FIG. 6 may be executed on at least one processor such as the example processor 812 of FIG. 8. In other examples, the machine learning model deployment means is implemented by hardware logic, hardware implemented state machines, logic circuitry, and/or any other combination of hardware, software, and/or firmware.

In the illustrated example of FIG. 2, the layer generation controller 204 includes the data partitioning controller 210, the hidden state selection controller 212, the operation selection controller 214, and the hidden state combination controller 216. The layer generation controller 204 generates slice layer, normal layer, and reduction layers. Normal layers include a convolution that generates a feature map of the same dimension as the input. Reduction layers include a convolution that generates a features map which is half the size of the input. In examples disclosed herein, normal layers and reduction layers are optimized and learned by the reinforcement learning search method. The actual internal representation of these layers is searched for by the layer generation controller 204 from a list of kernels optimized for a given target hardware platform (e.g., the target hardware platform 106). Based on two initial hidden states, the layer generation controller 204 recursively predicts the remainder of the structure of the child model (e.g., child neural network) topology.

In the illustrated example of FIG. 2, the data partitioning controller 210 generates ones or more slice operations to divide input data of the child model into partitions that are suitable for memory parameters and/or memory requirements at the target hardware platform 106. For example, the data partitioning controller 210 generates slice operations based on the memory capacity at the target hardware platform 106 and/or other THP specific information. In examples disclosed herein, the data partitioning controller 210 determines the number of slice operations based on local device memory at the target hardware platform 106.

In some examples, the data partitioning controller 210 implements example means for partitioning data. The data partitioning means is implemented by executable instructions such as that implemented by at least block 702 of FIG. 7. The executable instructions of block 702 of FIG. 7 may be executed on at least one processor such as the example processor 812 of FIG. 8. In other examples, the data partitioning means is implemented by hardware logic, hardware implemented state machines, logic circuitry, and/or any other combination of hardware, software, and/or firmware.

In the illustrated example of FIG. 2, the hidden state selection controller 212 is implemented by a controller. In additional or alternative examples, the hidden state selection controller 212 can be implemented by one or more analog or digital circuit(s), logic circuits, programmable processor(s), programmable controller(s), GPU(s), DSP(s), ASIC(s), PLD(s) and/or FPLD(s). The hidden state selection controller 212 selects hidden states to combine to produce a new hidden state. In examples disclosed herein, a hidden state refers a process that is not directly observable by an outside observer.

In the illustrated example of FIG. 2, the hidden state selection controller 212 selects the hidden states from a list of hidden states. The list of hidden states includes at least two initial states and/or any additional hidden states generated by the hidden state combination controller 216. For example, the list of hidden states can be stored in the datastore 218 and the hidden state selection controller 212 can select hidden states by accessing the datastore 218. In examples disclosed herein, the hidden state selection controller 212 selects two hidden states from the list of potential hidden states.

In some examples, the hidden state selection controller 212 implements example means for selecting hidden states. The hidden state selecting means is implemented by executable instructions such as that implemented by at least blocks 704 and 706 of FIG. 7. The executable instructions of blocks 704 and 706 of FIG. 7 may be executed on at least one processor such as the example processor 812 of FIG. 8. In other examples, the hidden state selecting means is implemented by hardware logic, hardware implemented state machines, logic circuitry, and/or any other combination of hardware, software, and/or firmware.

In the illustrated example of FIG. 2, the operation selection controller 214 is implemented by a controller. In additional or alternative examples, the operation selection controller 214 can be implemented by one or more analog or digital circuit(s), logic circuits, programmable processor(s), programmable controller(s), GPU(s), DSP(s), ASIC(s), PLD(s) and/or FPLD(s). The operation selection controller 214 selects operations to apply to (e.g., execute on) one or more of the selected hidden states.

In the illustrated example of FIG. 2, the operation selection controller 214 selects operations to execute on the one or more selected hidden states from a list of operations included in the THP specific information. The list of operations includes a list of kernels optimized for a given target hardware platform (e.g., the target hardware platform 106). For example, if the target hardware platform 106 implements the Intel® NNP-I 1000 architecture (e.g., an AI inference accelerator), the list of operations can include an identity operation, a 3×3 depth-wise-separable convolution, a 5×5 depth-wise-separable convolution, a 1×1 regular convolution, a 2×2 max pooling, and an early exit operation.

Convolutional layers of neural networks typically include an input parameter, an output parameter, a width parameter, and a height parameter where the total number of parameters for the layer is the product of the input parameter, the output parameter, the width parameter, and the height parameter (e.g., input*output*width*height). When executing a convolutional layer, a hardware platform may apply a filter (sometimes referred to as a kernel) which is a n by m by d matrix that the hardware platform "steps" through the input data. For example, n and m refer to the length and width of the filter and d refers to the depth of the filter which may also the same dimension as the height of the input data.

In examples disclosed herein, depth-wise convolutions refer to a layer of a neural network in which a hardware platform executing the layer splits the input data and the filter into separate channels. Depth-wise convolutions also refer to a layer of a neural network in which a hardware platform executing the layer convolves the corresponding input channels and the filter channels before combining the results. For example, for a hardware platform applying a 3×3×3 filter to a red, green, blue (RGB) image, a depth-wise convolution includes the hardware platform splitting the input image into separate red, green, and blue channels (e.g., three input channels) and convolving those channels with a respective 3×3×1 filter. In examples disclosed herein, a depth-wise-separable convolution refers to a depth-wise convolution that is supplemented by o 1×1×d filter, where o refers to the number of output channels and d refers to the number of input channels. For a hardware platform applying a 3×3×3 filter to an RGB image, a depth-wise-separable convolution includes the depth-wise convolution discussed above supplemented by convolving o 1×1×3 filters with the result of the depth-wise convolution.

In some examples, the operation selection controller 214 implements example means for selecting operations. The operation selecting means is implemented by executable instructions such as that implemented by at least blocks 708 and 710 of FIG. 7. The executable instructions of blocks 708 and 710 of FIG. 7 may be executed on at least one processor such as the example processor 812 of FIG. 8. In other examples, the operation selecting means is implemented by hardware logic, hardware implemented state machines, logic circuitry, and/or any other combination of hardware, software, and/or firmware.

In the illustrated example of FIG. 2, the hidden state combination controller 216 is implemented by a controller. In additional or alternative examples, the hidden state combination controller 216 can be implemented by one or more analog or digital circuit(s), logic circuits, programmable processor(s), programmable controller(s), GPU(s), DSP(s), ASIC(s), PLD(s) and/or FPLD(s). The hidden state combination controller 216 selects operations by which to combine two hidden states to generate a new hidden state.

In the illustrated example of FIG. 2, the operations by which to combine two (or more) hidden states include adding the two layers together, concatenating the two layers, among others. After creating a new hidden state, the hidden state combination controller 216 appends the new hidden state to the list of potential hidden states. The hidden state combination controller 216 additionally determines whether additional hidden states are to be generated for a given layer.

In the illustrated example of FIG. 2, if additional hidden states are to be generated, the hidden state combination controller 216 notifies the hidden state selection controller 212 as such. The hidden state selection controller 212 then selects two (or more) hidden states from the list of potential hidden states and repeats the processes described herein. If additional hidden states are not to be generated, the hidden state combination controller 216 concatenates all hidden states in the list of potential hidden states to generate a layer of the child model (e.g., child network). The hidden state combination controller 216 additionally determines whether there are additional layers of the child model (e.g., child network) to generate.

In the illustrated example of FIG. 2, if there are additional layers to generate for the child model (e.g., child network), the hidden state combination controller 216 notifies the hidden state selection controller 212 as such. The hidden state selection controller 212 then selects two (or more) hidden states from the list of potential hidden states and repeats the processes described herein. If there are no additional layers to generate for the child model (e.g., child network), the child model has been generated and the hidden state combination controller 216 transmits the child models to the training hardware platform 206 for execution and training. In this manner, despite the possibility that the training hardware platform 206 may be different than the target hardware platform 106, examples disclosed herein ensure that the trained model is optimized (e.g., within a threshold of a benchmark) with the target hardware platform 106 in mind.

By implementing examples disclosed herein, child models yield optimized performance for a target hardware platform while achieving state of the art accuracy on challenge datasets, such as ImageNet of CIFAR-10. For example, by selecting from the NNP-I 1000 optimized kernels, referenced in connection with FIG. 2, the operation selection controller 214 ensures the child model yields optimized (e.g., within a threshold of a benchmark) performance on the NNP-I 1000 architecture while achieving state of the art accuracy on ImageNet. For example, a model designed for the NNP-I 1000 architecture and deployed therein achieved 96.2% accuracy on Top-5 and 82.7% on Top-I.

In some examples, the hidden state combination controller 216 implements example means for combining hidden states. The hidden state combining means is implemented by executable instructions such as that implemented by at least blocks 712, 714, 716, 718, and 720 of FIG. 7. The executable instructions of blocks 712, 714, 716, 718, and 720 of FIG. 7 may be executed on at least one processor such as the example processor 812 of FIG. 8. In other examples, the hidden state combining means is implemented by hardware logic, hardware implemented state machines, logic circuitry, and/or any other combination of hardware, software, and/or firmware.

In the illustrated example of FIG. 2, the datastore 218 is configured to store data. For example, the datastore 218 can store one or more files indicative of one or more trained models, one or more layers, one or more hidden states, one or more lists of hidden states, one or more operations to apply to hidden states, THP specific information for one or more target hardware platforms, among others. As discussed above, THP specific information includes operators (e.g., functions, operations, etc.) that are conditioned for the target hardware platform, kernels that are optimized for the target hardware platform, a latency estimator that is specific to the target hardware platform, memory capabilities of the target hardware platform, memory bandwidth of the target hardware platform, among others.

In the illustrated example of FIG. 2, the datastore 218 may be implemented by a volatile memory (e.g., a Synchronous Dynamic Random Access Memory (SDRAM), Dynamic Random Access Memory (DRAM), RAMBUS Dynamic Random Access Memory (RDRAM), etc.) and/or a non-volatile memory (e.g., flash memory). The example datastore 218 may additionally or alternatively be implemented by one or more double data rate (DDR) memories, such as DDR, DDR2, DDR3, DDR4, mobile DDR (mDDR), etc. The example datastore 218 may additionally or alternatively be implemented by one or more mass storage devices such as hard disk drive(s), compact disk drive(s), digital versatile disk drive(s), solid-state disk drive(s), etc. While in the illustrated example the datastore 218 is illustrated as a single database, the datastore 218 may be implemented by any number and/or type(s) of databases. Furthermore, the data stored in the datastore 218 may be in any data format such as, for example, binary data, comma delimited data, tab delimited data, structured query language (SQL) structures, etc.

While references have been made to the ImageNet dataset and CIFAR-10 dataset, examples disclosed herein can be seamlessly expanded to other problem domains. Furthermore, while references have been made to the NNP-I 1000 architecture, examples disclosed herein are not limited to NNP-I 1000. For example, examples disclosed herein can be applied to other accelerators such as those produced by Movidius® or for any of the Intel® Core™ processors. For example, the operation selection controller 214 may select one or more operations to apply to hidden states from the respective optimized kernels for accelerators produced by Movidius® or for any of the Intel® Core™ processor family, among others. In general, examples disclosed herein can be applied for any target hardware platform and not specific to any one hardware platform. Example performance numbers are shown for reference only. Examples disclosed herein can be applied to any target hardware platform yielding similar performance gains, as described above. As described above, contrary to previous techniques, examples disclosed herein do not optimize an existing model to run on a specific hardware platform, but instead generate a new hardware-optimized machine learning model (e.g., neural network) for the problem at hand, such as achieving improved object recognition accuracy, improving pattern matching, and/or improving image identification accuracy of systems using the ImageNet dataset.

FIG. 3A is a visual representation of example processes 300 executed by the example model training controller 102 of FIG. 1 to generate layers of a machine learning model. For example, at operation 302, the hidden state selection controller 212 selects a first hidden state. At operation 304, the hidden state selection controller 212 selects a second hidden state. For example, on a first execution of the example processes of FIG. 3A, the hidden state selection controller 212 selects the first and second hidden state from two initial hidden states $h_t$ and $h_{t-1}$.

In the illustrated example of FIG. 3A, at operation 306, the operation selection controller 214 selects a first operation to apply to (e.g., execute on) the first hidden state. At operation 308, the operation selection controller 214 selects a second operation to apply to (e.g., execute on) the second hidden state. At operations 306 and 308, the operation selection controller 214 selects the first operation and the second operation based on the THP specific information. For example, the THP specific information includes a list of kernels optimized for a given target hardware platform (e.g., the target hardware platform 106). For example, if the target hardware platform 106 implements the Intel® NNP-I 1000 architecture, the list of operations can include an identity operation, a 3×3 depth-wise-separable convolution, a 5×5 depth-wise-separable convolution, a 1×1 regular convolution, a 2×2 max pooling, and an early exit operation In the illustrated example of FIG. 3A, at operation 310, the hidden state combination controller 216 selects a third operation by which to combine the first hidden state and the second hidden state. For example, the third operation can be an add operation, a concatenate operation, among others. After determining the first two hidden states, the layer generation controller 204 recursively predicts the rest of the structure of the child model (e.g., neural network) topology (e.g., repeats at least the operations 302, 304, 306, 308, and 310 for each layer).

FIG. 3B is an example illustration 312 of the processes 300 of FIG. 3A. For example, the hidden state selection controller 212 selects from an example list of potential hidden states 314 an example first hidden state 316 and an example second hidden state 318 (e.g., operations 302 and 304). For example, the list of potential hidden states 314 may be stored in the datastore 218. While the processes 300 are illustrated serially, the hidden state selection controller 212, the operation selections controller 214, the hidden state combination controller 216, and/or, more generally, the layer generation controller 204 may implement one or more softmax classifiers to select hidden states, operation to apply to the hidden states, and/or operations by which to combine hidden states in parallel or substantially in parallel (e.g., +/−1 second). As such, the illustration 312 is illustrated in parallel.

In the illustrated example of FIG. 3B, the operation selection controller 214 selects an example first operation 320 to apply to (e.g., execute on) the first hidden state 316. For example, the first operation 320 is a 3×3 convolution. The operation selection controller 214 selects an example second operation 322 to apply to (execute on) the second hidden state 318. For example, the second operation 322 is a 2×2 max pooling operation. The operation selection controller 214 selects the example first operation 320 and the example second operation 322 from THP specific information including a list of kernels optimized for a given target hardware platform (e.g., the target hardware platform 106).

In the illustrated example of FIG. 3B, the hidden state combination controller 216 selects an example third operation 324 by which to combine the first hidden state 316 (after being operated on by the operation selection controller 214 in accordance with the first operation 320) and the second hidden state 318 (after being operated on by the operation selection controller 214 in accordance with the second operation 322). After executing the third operation 324 (e.g., an ADD operation), the hidden state combination controller 216 generates an example new hidden state 326 and appends the new hidden state 326 to the list of potential hidden states 314 (e.g., stores the new hidden state 326 in the datastore 218) for future hidden state generation.

Figure 4:
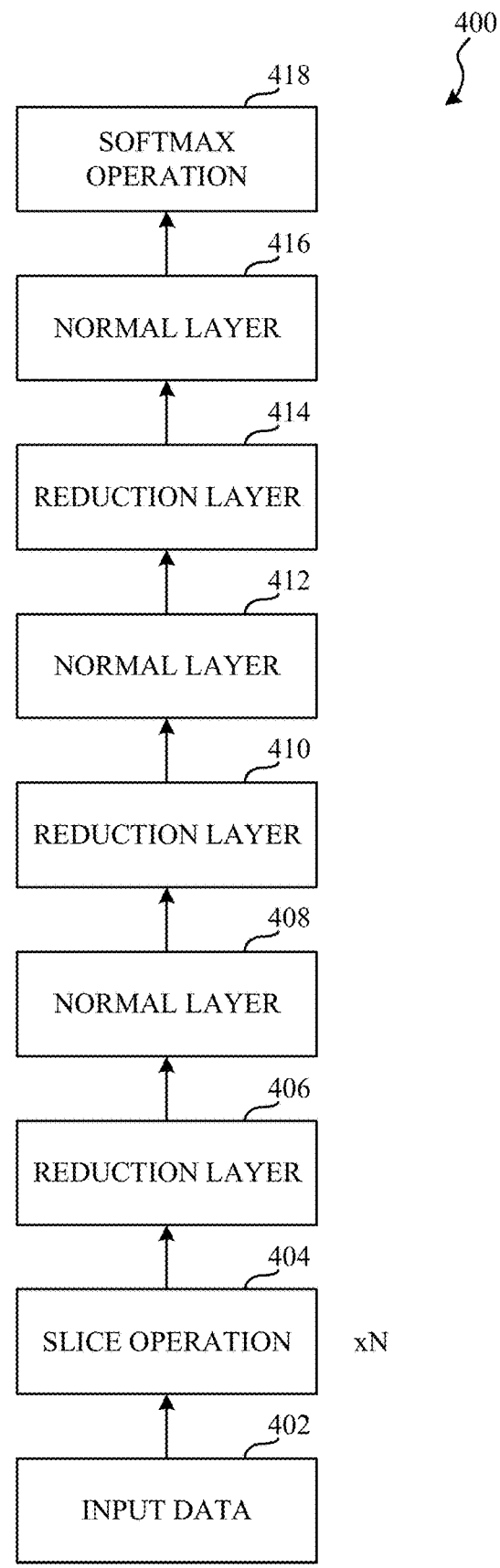
FIG. 4 is a block diagram showing an example architecture of a machine learning model trained by the example model training controller of FIG. 1.

FIG. 4 is a block diagram showing an example architecture 400 of a machine learning model trained by the example model training controller 102 of FIG. 1. For example, the example architecture 400 includes example input data 402, which is operated on by a target hardware platform executing one or more example slice operations 404. For example, the target hardware platform executing the one or more slice operations 404 splits large input data (e.g., image data, audio data, etc.) into smaller partitions that are suitable for (e.g., fit in) local device memory at a target hardware platform. The number of slice operations 404 (e.g., N) that the data partitioning controller 210 generates for the architecture 400 is dependent and/or otherwise based on the memory capacity of the target hardware platform (e.g., the target hardware platform 106 of FIG. 1).

In the illustrated example of FIG. 4, the architecture 400 includes example reduction layers 406, 410, and 414. In examples disclosed herein, reduction layers include a convolution that generates a feature map which is half the size of the input data. The architecture 400 includes example normal layers 408, 412, and 416. In examples disclosed herein, normal layers include a convolution that generates a feature map of the same dimension as the input data. The example architecture 400 additionally includes an example softmax operation 418 during which the machine learning model makes a classification based on the example input data 402.

Figure 5:
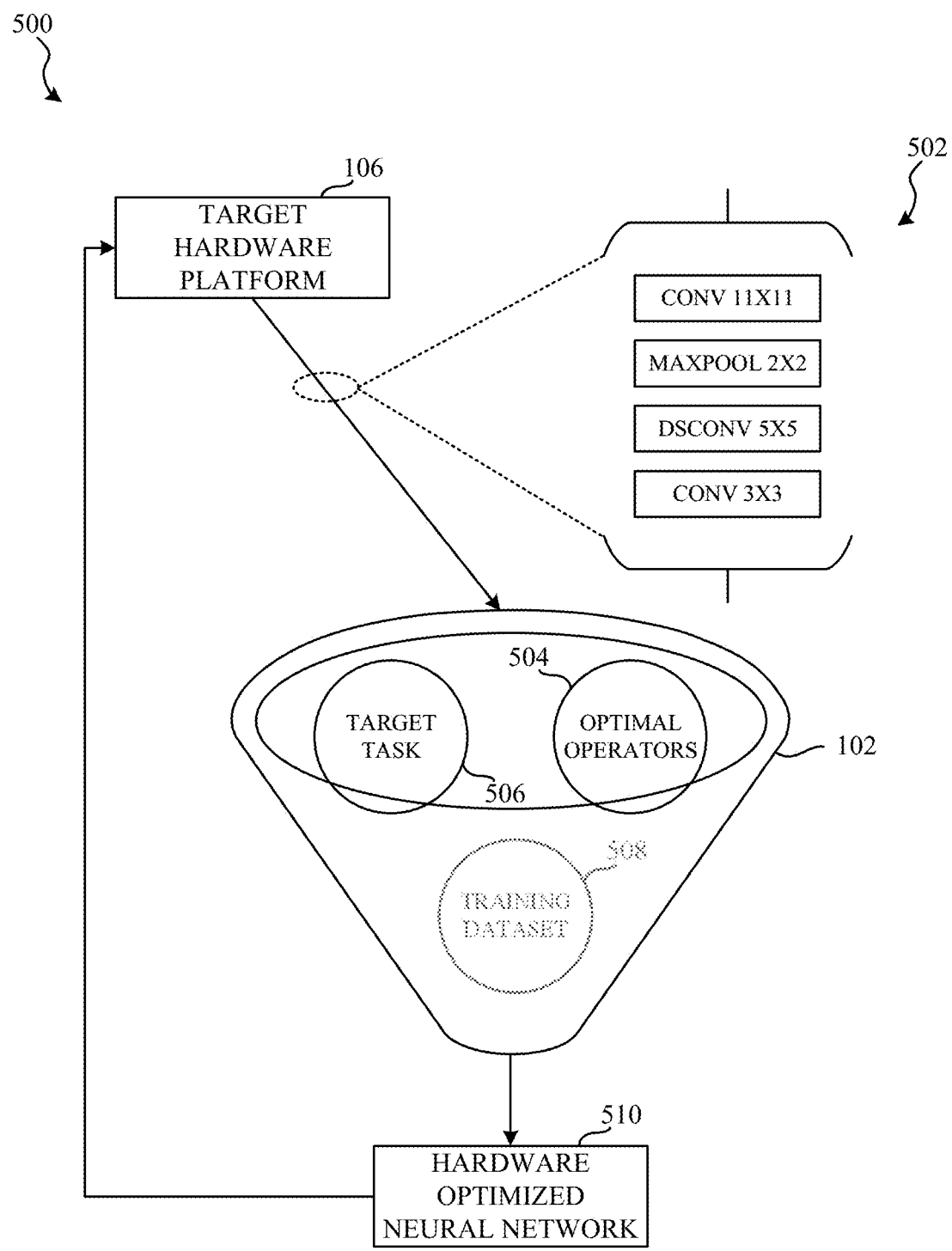
FIG. 5 is an illustration of an example environment including the example model training controller of FIG. 1.

FIG. 5 is an illustration of an example environment 500 including the example model training controller 102 of FIG. 1. The example environment 500 includes the example model training controller 102 and the example target hardware platform 106 of FIG. 1.

In the illustrated example of FIG. 5, the model training controller 102 can be implemented as described in connection with FIG. 1. Additionally, the target hardware platform 106 can be implemented as described in connection with FIG. 1. In the example of FIG. 5, the target hardware platform 106 transmits THP specific information to the model training controller 102. For example, the THP specific information includes an example list 502 of optimal operators for the target hardware platform 106 from which the model training controller 102 is to search. In the example of FIG. 5, the list 502 of optimal operators for the target hardware platform 106 includes an 11×11 convolution, a 2×2 max pool operation, a 5×5 depth-wise-separable convolution, and a 3×3 convolution.

In the illustrated example of FIG. 5, after retrieving and/or otherwise obtaining the THP specific information for the target hardware platform 106, the model training controller 102 searches the THP specific information for example optimal operators 504. After finding the optimal operators 504, the model training controller 102 generates one or more layers of a child model to achieve an example target task 506 based on the optimal operators 504. For example, the target task 506 may be object recognition in images.

In the illustrated example of FIG. 5, the model training controller 102 trains the child model with an example training dataset 508. For example, the training dataset 508 may be the ImageNet dataset. In some examples, the training dataset 508 may be the CIFAR-10 dataset. In the example of FIG. 5, the model training controller 102 trains the child model until a specified target error metric is satisfied. For example, the model training controller 102 trains the child model to satisfy a target accuracy on the training dataset 508.

In the illustrated example of FIG. 5, after the model training controller 102 verifies that the child model has satisfied the target error metric, the model training controller 102 deploys an example hardware optimized neural network 510 to the target hardware platform 106. In this manner, the model training controller 102 generates the hardware optimized neural network 510 to achieve the target task 506.

While an example manner of implementing the model training controller 102 of FIG. 1 is illustrated in FIGS. 2, 3A, 3B, 4, and/or 5 one or more of the elements, processes and/or devices illustrated in FIGS. 2, 3A, 3B, 4, and/or 5 may be combined, divided, re-arranged, omitted, eliminated and/or implemented in any other way. Further, the example communication processor 202, the example layer generation controller 204, the example training hardware platform 206, the example deployment controller 208, the example data partitioning controller 210, the example hidden state selection controller 212, the example operation selection controller 214, the example hidden state combination controller 216, the example datastore 218 and/or, more generally, the example model training controller 102 of FIGS. 1, 2, 3A, 3B, 4, and/or 5 may be implemented by hardware, software, firmware and/or any combination of hardware, software and/or firmware. Thus, for example, any of the example communication processor 202, the example layer generation controller 204, the example training hardware platform 206, the example deployment controller 208, the example data partitioning controller 210, the example hidden state selection controller 212, the example operation selection controller 214, the example hidden state combination controller 216, the example datastore 218 and/or, more generally, the example model training controller 102 of FIGS. 1, 2, 3A, 3B, 4, and/or 5 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example communication processor 202, the example layer generation controller 204, the example training hardware platform 206, the example deployment controller 208, the example data partitioning controller 210, the example hidden state selection controller 212, the example operation selection controller 214, the example hidden state combination controller 216, the example datastore 218 and/or, more generally, the example model training controller 102 of FIGS. 1, 2, 3A, 3B, 4, and/or 5 is/are hereby expressly defined to include a non-transitory computer readable storage device or storage disk such as a memory, a digital versatile disk (DVD), a compact disk (CD), a Blu-ray disk, etc. including the software and/or firmware. Further still, the example model training controller 102 of FIGS. 1, 2, 3A, 3B, 4, and/or 5 may include one or more elements, processes and/or devices in addition to, or instead of, those illustrated in FIGS. 1, 2, 3A, 3B, 4, and/or 5 and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 6:
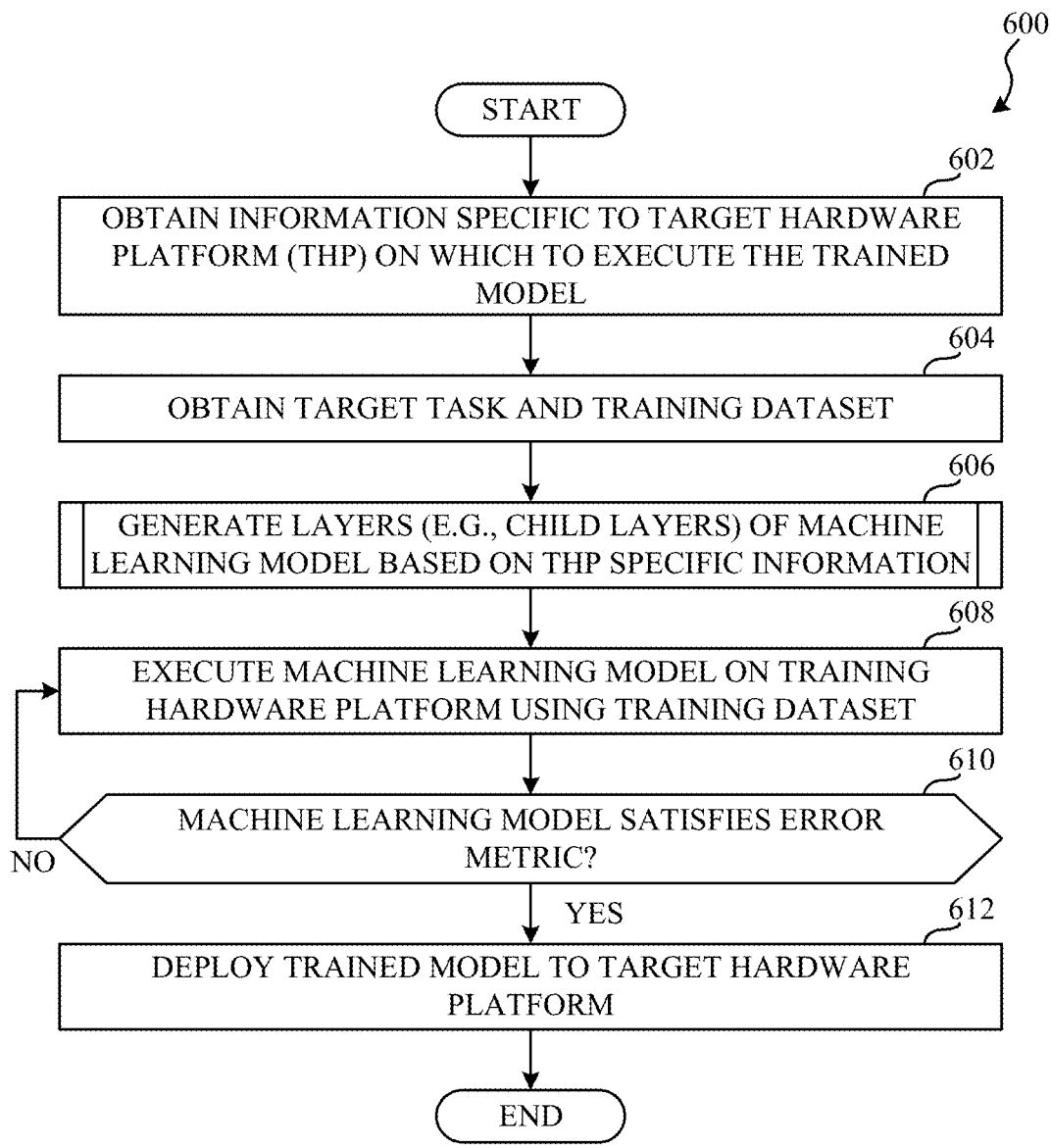
FIGS. 6 and 7 are flowcharts representative of machine-readable instructions which may be executed to implement the example model training controller of FIGS. 1, 2, 3A, 3B, 4, and/or 5 to train machine learning models.
Figure 7:
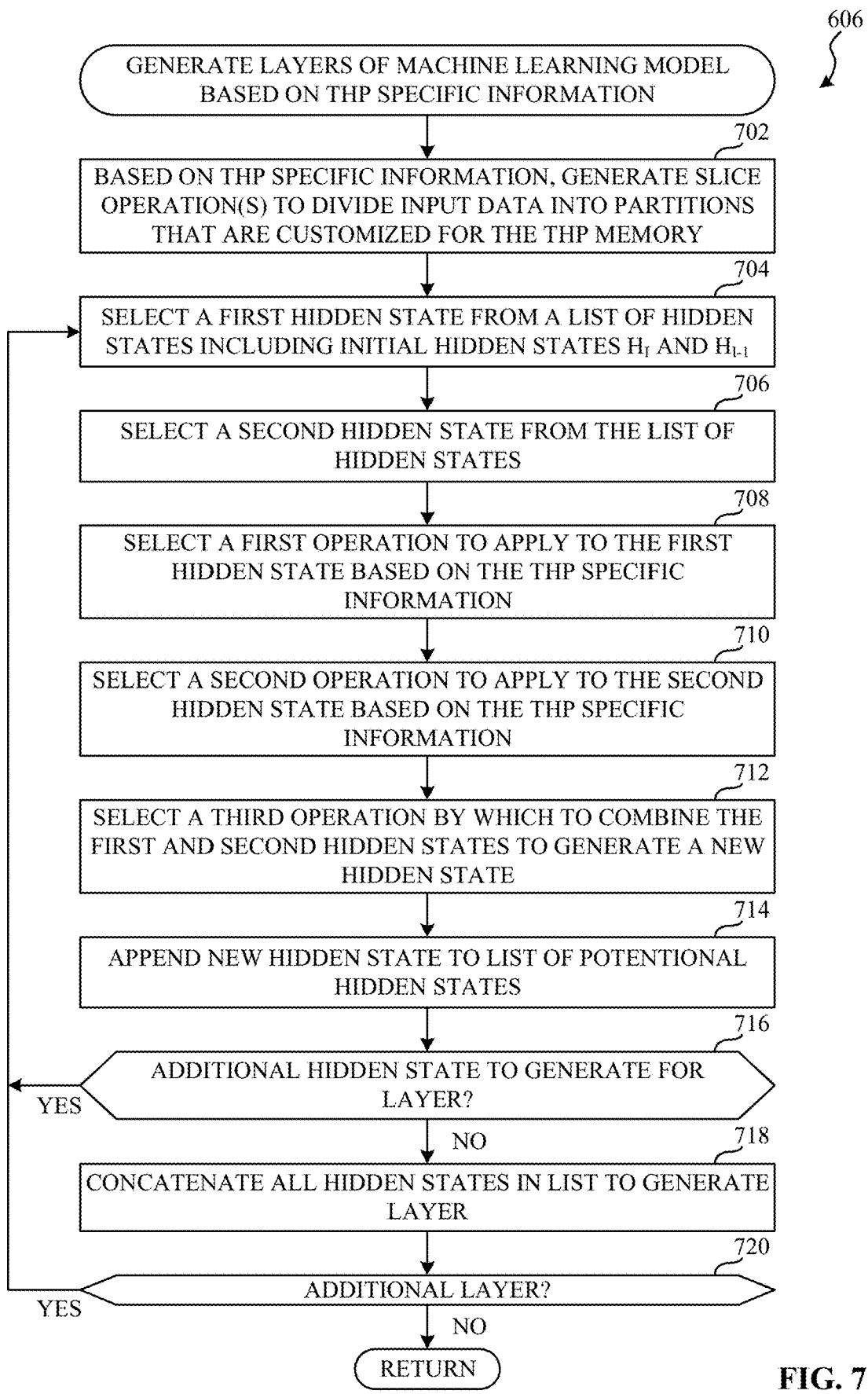

Flowcharts representative of example hardware logic, machine readable instructions, hardware implemented state machines, and/or any combination thereof for implementing the model training controller 102 of FIGS. 1, 2, 3A, 3B, 4, and/or 5 are shown in FIGS. 6 and 7. The machine readable instructions may be one or more executable programs or portion(s) of an executable program for execution by a computer processor and/or processor circuitry, such as the processor 812 shown in the example processor platform 800 discussed below in connection with FIG. 8. The program may be embodied in software stored on a non-transitory computer readable storage medium such as a CD-ROM, a floppy disk, a hard drive, a DVD, a Blu-ray disk, or a memory associated with the processor 812, but the entire program and/or parts thereof could alternatively be executed by a device other than the processor 812 and/or embodied in firmware or dedicated hardware. Further, although the example program is described with reference to the flowcharts illustrated in FIGS. 6 and 7, many other methods of implementing the example model training controller 102 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more devices (e.g., a multi-core processor in a single machine, multiple processors distributed across a server rack, etc.).

The machine-readable instructions described herein may be stored in one or more of a compressed format, an encrypted format, a fragmented format, a compiled format, an executable format, a packaged format, etc. Machine readable instructions as described herein may be stored as data or a data structure (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement one or more functions that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine-readable instructions described herein can be represented by any past, present, or future instruction language, scripting language, programming language, etc. For example, the machine-readable instructions may be represented using any of the following programming languages: C, C++, Java®, C#, Perl®, Python®, JavaScript®, HyperText Markup Language (HTML), Structured Query Language (SQL), Swift®, etc.

As mentioned above, the example processes of FIGS. 6 and/or 7 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

FIG. 6 is a flowchart representative of machine-readable instructions 600 which may be executed to implement the example model training controller 102 of FIGS. 1, 2, 3A, 3B, 4, and/or 5 to train machine learning models. The machine-readable instructions 600 begin at block 602 where the communication processor 202 obtains information specific to a target hardware platform (THP) on which to execute (e.g., deploy a trained model). In response to a request for a trained model (e.g., from a computing system, from a consumer, etc.) corresponding to a specific target hardware platform, the communication processor 202 can query the originating request (e.g., the example target hardware platform 106) for THP specific information. In some examples, the communication processor 202 provides an interface by which the requestor can enter, provide, and/or otherwise THP specific information.

In the illustrated example of FIG. 6, at block 604, the example communication processor 202 obtains a target task for the child model to achieve and a training dataset on which to train the child model. For example, the training dataset may be the ImageNet dataset, the CIFAR-10 dataset, among others. The example communication processor 202 can obtain the target task and/or the training dataset in accordance with techniques similar to those implemented to obtain the THP specific information.

In the illustrated example of FIG. 6, at block 606, the layer generation controller 204 generates layers of the child machine learning model based on the THP specific information. Additional detail of block 606 is illustrated and described in connection with FIG. 7. At block 608, the training hardware platform 206 executes the machine learning model using the training dataset.

In the illustrated example of FIG. 6, at block 610, the deployment controller 208 determines whether the machine learning model satisfies a given error metric. For example, the error metric can be a target $R^2$ error. In response to the deployment controller 208 determining that the machine learning model does not satisfy the given error metric (block 610: NO), the machine-readable instructions 600 return to block 608.

In the illustrated example of FIG. 6, in response to the deployment controller 208 determining that the machine learning model satisfies the given error metric (block 610: YES), the machine-readable instructions 600 proceed to block 612. At block 612, the deployment controller 208 deploys a trained model to the specified target hardware platform (e.g., the target hardware platform 106). After block 612, the machine-readable instructions 600 terminate.

FIG. 7 is a flowchart representative of machine-readable instructions 606 which may be executed to implement the example model training controller 102 of FIGS. 1, 2, 3A, 3B, 4, and/or 5 to generate layers of machine learning models based on target hardware platform specific information. The machine-readable instructions 606 begin at block 702 where the data partitioning controller 210 generates one or more slice operations to divide input data to the child model into partitions that are customized (e.g., optimized) for memory of the target hardware platform. In some examples, customized is sometimes referred to as optimized. For example, the data partitioning controller 210 generates one or more slice operations based on THP specific information such as memory capacity of a given target hardware platform.

In the illustrated example of FIG. 7, at block 704, the hidden state selection controller 212 selects a first hidden state from a list of hidden states including at least two initial states $h_i$ and $h_{i-1}$. At block 706, the hidden state selection controller 212 selects a second hidden state from the list of hidden states. At block 708, the operation selection controller 214 selects a first operation to apply to (e.g., execute on) the first hidden state. For example, the operation selection controller 214 selects the first operation from a list of kernels optimized for a given target hardware platform (e.g., the target hardware platform 106) at block 708.

In the illustrated example of FIG. 7, at block 710, the operation selection controller 214 selects a second operation to apply to (e.g., execute on) the second hidden state. For example, the operation selection controller 214 selects the second operation from a list of kernels optimized for a given target hardware platform (e.g., the target hardware platform 106) at block 710. At block 712, the hidden state combination controller 216 selects a third operation by which to combine the first and second hidden states to generate new hidden state. At block 714, the hidden state combination controller 216 appends the new hidden state to the list of potential hidden states. For example, the hidden state combination controller 216 is configured to store new hidden states in the datastore 218.

In the illustrated example of FIG. 7, at block 716, the hidden state combination controller 216 determines whether there are additional hidden states to generate for a layer. In response to the hidden state combination controller 216 determining that there are additional hidden states to generate for a layer (block 716: YES), the machine-readable instructions 606 return to block 704. In response to the hidden state combination controller 216 determining that there are not additional hidden states to generate for a layer (block 716: NO), the machine-readable instructions 606 proceed to block 718.

In the illustrated example of FIG. 7, at block 718, the hidden state combination controller 216 concatenates all hidden states in the list of potential hidden states to generate a layer. At block 720, the hidden state combination controller 216 determines whether there are additional layers to generate for the model. In response to the hidden state combination controller 216 determining that there are additional layers to generate (block 720: YES), the machine-readable instructions return to block 704. In response to the hidden state combination controller 216 determining that there are not additional layers to generate (block 720: NO), the machine-readable instructions return to the machine-readable instructions 600 at block 608.

Figure 8:
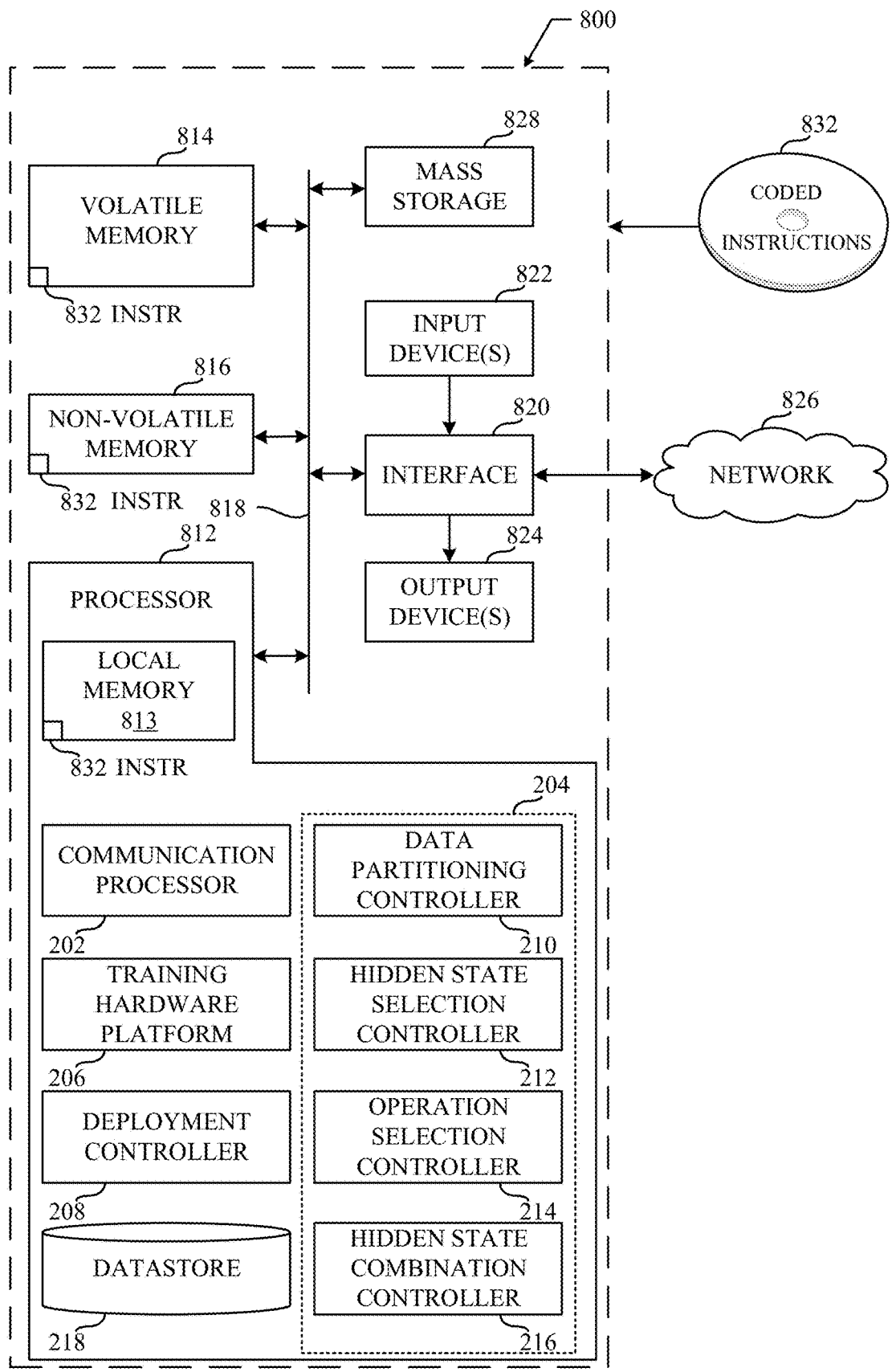
FIG. 8 is a block diagram of an example processing platform structured to execute the instructions of FIGS. 6 and/or 7 to implement the model training controller of FIGS. 1 and/or 2.

FIG. 8 is a block diagram of an example processing platform structured to execute the instructions of FIGS. 6 and/or 7 to implement the model training controller 102 of FIGS. 1, 2, 3A, 3B, 4, and/or 5. The processor platform 800 can be, for example, a server, a personal computer, a workstation, a self-learning machine (e.g., a neural network), a mobile device (e.g., a cell phone, a smart phone, a tablet such as an iPad), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 800 of the illustrated example includes a processor 812. The processor 812 of the illustrated example is hardware. For example, the processor 812 can be implemented by one or more integrated circuits, logic circuits, microprocessors, GPUs, DSPs, or controllers from any desired family or manufacturer. The hardware processor 812 may be a semiconductor based (e.g., silicon based) device. In this example, the processor 812 implements the example communication processor 202, the example layer generation controller 204, the example training hardware platform 206, the example deployment controller 208, the example data partitioning controller 210, the example hidden state selection controller 212, the example operation selection controller 214, the example hidden state combination controller 216, and/or the example datastore 218.

The processor 812 of the illustrated example includes a local memory 813 (e.g., a cache). The processor 812 of the illustrated example is in communication with a main memory including a volatile memory 814 and a non-volatile memory 816 via a bus 818. The volatile memory 814 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 816 may be implemented by flash memory and/or any other desired type of memory device. Access to the main memory 814, 816 is controlled by a memory controller.

The processor platform 800 of the illustrated example also includes an interface circuit 820. The interface circuit 820 may be implemented by any type of interface standard, such as an Ethernet interface, a universal serial bus (USB), a Bluetooth® interface, a near field communication (NFC) interface, and/or a PCI express interface.

In the illustrated example, one or more input devices 822 are connected to the interface circuit 820. The input device(s) 822 permit(s) a user to enter data and/or commands into the processor 812. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 824 are also connected to the interface circuit 820 of the illustrated example. The output devices 824 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 820 of the illustrated example, thus, typically includes a graphics driver card, a graphics driver chip, and/or a graphics driver processor.

The interface circuit 820 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 826. The communication can be via, for example, an Ethernet connection, a digital subscriber line (DSL) connection, a telephone line connection, a coaxial cable system, a satellite system, a line-of-site wireless system, a cellular telephone system, etc.

The processor platform 800 of the illustrated example also includes one or more mass storage devices 828 for storing software and/or data. Examples of such mass storage devices 828 include floppy disk drives, hard drive disks, compact disk drives, Blu-ray disk drives, redundant array of independent disks (RAID) systems, and digital versatile disk (DVD) drives.

The machine executable instructions 832 of FIG. 8 can be implemented by the machine-readable instructions 600 of FIG. 6 and/or the machine-readable instructions 606 of FIG. 7 and may be stored in the mass storage device 828, in the volatile memory 814, in the non-volatile memory 816, and/or on a removable non-transitory computer readable storage medium such as a CD or DVD. In some examples, the machine executable instructions 832 may be referred to as computer readable instructions 832).

Figure 9:
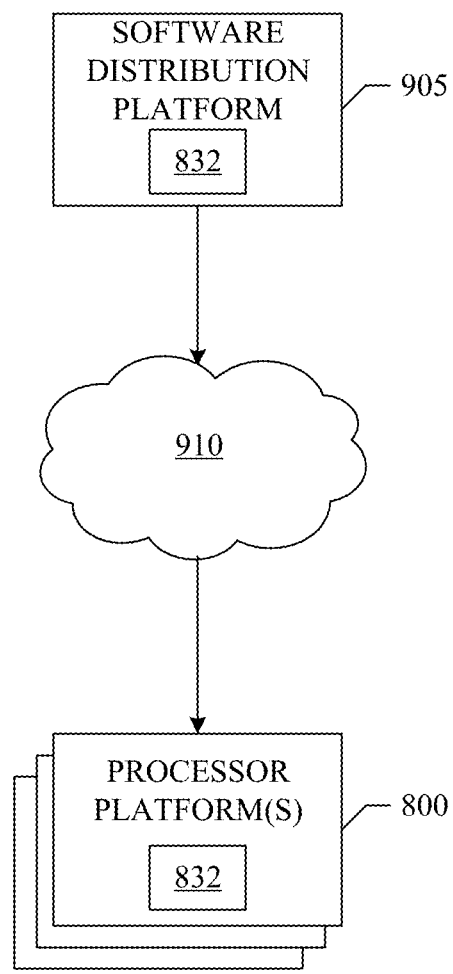
FIG. 9 is a block diagram of an example software distribution platform to distribute software (e.g., software corresponding to the example computer readable instructions of FIGS. 6 and/or 7) to client devices such as consumers (e.g., for license, sale and/or use), retailers (e.g., for sale, re-sale, license, and/or sub-license), and/or original equipment manufacturers (OEMs) (e.g., for inclusion in products to be distributed to, for example, retailers and/or to direct buy customers).

A block diagram illustrating an example software distribution platform 905 to distribute software such as the example computer readable instructions 832 of FIG. 8 to third parties is illustrated in FIG. 9. The example software distribution platform 905 may be implemented by any computer server, data facility, cloud service, etc., capable of storing and transmitting software to other computing devices. The third parties may be customers of the entity owning and/or operating the software distribution platform. For example, the entity that owns and/or operates the software distribution platform may be a developer, a seller, and/or a licensor of software such as the example computer readable instructions 832 of FIG. 8. The third parties may be consumers, users, retailers, OEMs, etc., who purchase and/or license the software for use and/or re-sale and/or sub-licensing. In the illustrated example, the software distribution platform 905 includes one or more servers and one or more storage devices. The storage devices store the computer readable instructions 832, which may correspond to the example machine-readable instructions 600 of FIG. 6 and/or the machine-readable instructions 606 of FIG. 7, as described above. The one or more servers of the example software distribution platform 905 are in communication with a network 910, which may correspond to any one or more of the Internet and/or any of the example network 104 described above. In some examples, the one or more servers are responsive to requests to transmit the software to a requesting party as part of a commercial transaction. Payment for the delivery, sale and/or license of the software may be handled by the one or more servers of the software distribution platform and/or via a third-party payment entity. The servers enable purchasers and/or licensors to download the computer readable instructions 832 from the software distribution platform 905. For example, the software, which may correspond to the example computer readable instructions 832 of FIG. 8, may be downloaded to the example processor platform 800, which is to execute the computer readable instructions 832 to implement the model training controller 102. In some example, one or more servers of the software distribution platform 905 periodically offer, transmit, and/or force updates to the software (e.g., the example computer readable instructions 832 of FIG. 8) to ensure improvements, patches, updates, etc. are distributed and applied to the software at the end user devices.

From the foregoing, it will be appreciated that example methods, apparatus and articles of manufacture have been disclosed that optimize (e.g., within a threshold of a benchmark) layers of a machine learning model for a target hardware platform. Examples disclosed herein generate a machine learning model with layers that are optimized (e.g., within a threshold of a benchmark) for a target hardware platform. Examples disclosed herein then train the target hardware platform specific model for a target task. Examples disclosed herein are contrary to previous techniques that attempt to optimize an existing model for a specific device.

As such, examples disclosed herein improve the efficiency and efficacy of machine learning models when executed at a hardware platform. Examples disclosed herein reduce the computational burden of executing a machine learning model on hardware other than the training hardware and improve the classification accuracy of such models. The disclosed methods, apparatus and articles of manufacture improve the efficiency of using a computing device by improving the performance of machine learning models at a hardware platform. The disclosed methods, apparatus and articles of manufacture are accordingly directed to one or more improvement(s) in the functioning of a computer.

Example methods, apparatus, systems, and articles of manufacture to optimize layers of a machine learning model for a target hardware platform are disclosed herein. Further examples and combinations thereof include the following:

Example 1 includes an apparatus to generate layers of a machine learning model for a target hardware platform, the apparatus comprising a communication processor to obtain information specific to the target hardware platform (THP) on which to execute the machine learning model, a layer generation controller to generate layers of the machine learning model based on the information specific to the THP, and a deployment controller to, in response to the machine learning model satisfying a threshold error metric, deploy the machine learning model to the THP.

Example 2 includes the apparatus of example 1, wherein during training of the machine learning model, the machine learning model is executed on a training hardware platform different than the THP.

Example 3 includes the apparatus of example 1, further including a data partitioning controller to generate slice operations to divide input data to the machine learning model into partitions that correspond to memory requirements of the THP.

Example 4 includes the apparatus of example 1, further including a hidden state selection controller to select a first hidden state for a first layer of the machine learning model from a list of hidden states that is to include new hidden states, and select a second hidden state for the first layer of the machine learning model from the list of hidden states.

Example 5 includes the apparatus of example 4, further including an operation selection controller to select a first operation to apply to the first hidden state based on the information specific to the THP, and select a second operation to apply to the second hidden state based on the information specific to the THP.

Example 6 includes the apparatus of example 5, further including a hidden state combination controller to select a third operation by which to combine the first hidden state and the second hidden state to generate a first one of the new hidden states, the hidden state combination controller to execute the third operation after (a) the first hidden state has been operated on in accordance with the first operation and (b) the second hidden state has been operated on in accordance with the second operation.

Example 7 includes the apparatus of example 1, wherein the information specific to the THP includes at least one of operators that are conditioned for the THP, kernels that are optimized for the THP, a latency estimator that is specific to the THP, memory capabilities of the THP, or memory bandwidth of the THP.

Example 8 includes the apparatus of example 1, wherein the layers of the machine learning model include one or more operators including kernels that are tuned to the target hardware platform.

Example 9 includes the apparatus of example 1, wherein the threshold error metric corresponds to a numeric level of accuracy achieving a target task on a training dataset.

Example 10 includes a tangible computer-readable medium comprising instructions which, when executed, cause at least one processor to at least obtain information specific to a target hardware platform (THP) on which to execute a machine learning model, generate layers of the machine learning model based on information specific to the THP, and in response to the machine learning model satisfying a threshold error metric, deploy the machine learning model to the THP.

Example 11 includes the tangible computer-readable medium of example 10, wherein the instructions, when executed, cause the at least one processor to, during training of the machine learning model, execute the machine learning model, the at least one processor different than the THP.

Example 12 includes the tangible computer-readable medium of example 10, wherein the instructions, when executed, cause the at least one processor to generate slice operations to divide input data to the machine learning model into partitions that correspond to memory requirements of the THP.

Example 13 includes the tangible computer-readable medium of example 10, wherein the instructions, when executed, cause the at least one processor to select a first hidden state for a first layer of the machine learning model from a list of hidden states that is to include new hidden states, and select a second hidden state for the first layer of the machine learning model from the list of hidden states.

Example 14 includes the tangible computer-readable medium of example 13, wherein the instructions, when executed, cause the at least one processor to select a first operation to apply to the first hidden state based on the information specific to the THP, and select a second operation to apply to the second hidden state based on the information specific to the THP.

Example 15 includes the tangible computer-readable medium of example 14, wherein the instructions, when executed, cause the at least one processor to select a third operation by which to combine the first hidden state and the second hidden state to generate a first one of the new hidden states, the at least one processor to execute the third operation after (a) the first hidden state has been operated on in accordance with the first operation and (b) the second hidden state has been operated on in accordance with the second operation.

Example 16 includes the tangible computer-readable medium of example 10, wherein the information specific to the THP includes at least one of operators that are conditioned for the THP, kernels that are optimized for the THP, a latency estimator that is specific to the THP, memory capabilities of the THP, or memory bandwidth of the THP.

Example 17 includes the tangible computer-readable medium of example 10, wherein the layers of the machine learning model include one or more operators including kernels that are tuned to the target hardware platform.

Example 18 includes the tangible computer-readable medium of example 10, wherein the threshold error metric corresponds to a numeric level of accuracy achieving a target task on a training dataset.

Example 19 includes an apparatus to generate layers of a machine learning model for a target hardware platform, the apparatus comprising means for processing communications to obtain information specific to the target hardware platform (THP) on which to execute the machine learning model, means for generating layers of the machine learning model to generate layers of the machine learning model based on the information specific to the THP, and means for deploying machine learning models to, in response to the machine learning model satisfying a threshold error metric, deploy the machine learning model to the THP.

Example 20 includes the apparatus of example 19, wherein during training of the machine learning model, the machine learning model is executed on a training hardware platform different than the THP.

Example 21 includes the apparatus of example 19, further including means for partitioning data to generate slice operations to divide input data to the machine learning model into partitions that correspond to memory requirements of the THP.

Example 22 includes the apparatus of example 19, further including means for selecting hidden states to select a first hidden state for a first layer of the machine learning model from a list of hidden states that is to include new hidden states, and select a second hidden state for the first layer of the machine learning model from the list of hidden states.

Example 23 includes the apparatus of example 22, further including means for selecting operations to select a first operation to apply to the first hidden state based on the information specific to the THP, and select a second operation to apply to the second hidden state based on the information specific to the THP.

Example 24 includes the apparatus of example 23, further including means for combining hidden states to select a third operation by which to combine the first hidden state and the second hidden state to generate a first one of the new hidden states, the means for combining hidden states to execute the third operation after (a) the first hidden state has been operated on in accordance with the first operation and (b) the second hidden state has been operated on in accordance with the second operation.

Example 25 includes the apparatus of example 19, wherein the information specific to the THP includes at least one of operators that are conditioned for the THP, kernels that are optimized for the THP, a latency estimator that is specific to the THP, memory capabilities of the THP, or memory bandwidth of the THP.

Example 26 includes the apparatus of example 19, wherein the layers of the machine learning model include one or more operators including kernels that are tuned to the target hardware platform.

Example 27 includes the apparatus of example 19, wherein the threshold error metric corresponds to a numeric level of accuracy achieving a target task on a training dataset.

Example 28 includes a server to distribute first instructions on a network, the server comprising at least one storage device including second instructions, and at least one processor to execute the second instructions to transmit the first instructions over the network, the first instructions, when executed, to cause at least one device to obtain information specific to a target hardware platform (THP) on which to execute a machine learning model, generate layers of the machine learning model based on information specific to the THP, and in response to the machine learning model satisfying a threshold error metric, deploy the machine learning model to the THP.

Example 29 includes the server of example 28, wherein the first instructions, when executed, cause the at least one device to, during training of the machine learning model, execute the machine learning model, the at least one device different than the THP.

Example 30 includes the server of example 28, wherein the first instructions, when executed, cause the at least one device to generate slice operations to divide input data to the machine learning model into partitions that correspond to memory requirements of the THP.

Example 31 includes the server of example 28, wherein the first instructions, when executed, cause the at least one device to select a first hidden state for a first layer of the machine learning model from a list of hidden states that is to include new hidden states, and select a second hidden state for the first layer of the machine learning model from the list of hidden states.

Example 32 includes the server of example 31, wherein the first instructions, when executed, cause the at least one device to select a first operation to apply to the first hidden state based on the information specific to the THP, and select a second operation to apply to the second hidden state based on the information specific to the THP.

Example 33 includes the server of example 32, wherein the first instructions, when executed, cause the at least one device to select a third operation by which to combine the first hidden state and the second hidden state to generate a first one of the new hidden states, the at least one device to execute the third operation after (a) the first hidden state has been operated on in accordance with the first operation and (b) the second hidden state has been operated on in accordance with the second operation.

Example 34 includes the server of example 28, wherein the information specific to the THP includes at least one of operators that are conditioned for the THP, kernels that are optimized for the THP, a latency estimator that is specific to the THP, memory capabilities of the THP, or memory bandwidth of the THP.

Example 35 includes the server of example 28, wherein the layers of the machine learning model include one or more operators including kernels that are tuned to the target hardware platform.

Example 36 includes the server of example 28, wherein the threshold error metric corresponds to a numeric level of accuracy achieving a target task on a training dataset.

Example 37 includes a method to generate layers of a machine learning model for a target hardware platform, the method comprising obtaining, by executing instructions with at least one processor, information specific to the target hardware platform (THP) on which to execute the machine learning model, generating, by executing instructions with the at least one processor, layers of the machine learning model based on information specific to the THP, and in response to the machine learning model satisfying a threshold error metric, deploying, by executing instructions with the at least one processor, the machine learning model to the THP.

Example 38 includes the method of example 37, further including, during training of the machine learning model, executing the machine learning model at a training hardware platform, the training hardware platform different than the THP.

Example 39 includes the method of example 37, further including generating slice operations to divide input data to the machine learning model into partitions that correspond to memory requirements of the THP.

Example 40 includes the method of example 37, further including selecting a first hidden state for a first layer of the machine learning model from a list of hidden states that is to include new hidden states, and selecting a second hidden state for the first layer of the machine learning model from the list of hidden states.

Example 41 includes the method of example 40, further including selecting a first operation to apply to the first hidden state based on the information specific to the THP, and selecting a second operation to apply to the second hidden state based on the information specific to the THP.

Example 42 includes the method of example 41, further including selecting a third operation by which to combine the first hidden state and the second hidden state to generate a first one of the new hidden states, and executing the third operation after (a) the first hidden state has been operated on in accordance with the first operation and (b) the second hidden state has been operated on in accordance with the second operation.

Example 43 includes the method of example 37, wherein the information specific to the THP includes at least one of operators that are conditioned for the THP, kernels that are optimized for the THP, a latency estimator that is specific to the THP, memory capabilities of the THP, or memory bandwidth of the THP.

Example 44 includes the method of example 37, wherein the layers of the machine learning model include one or more operators including kernels that are tuned to the target hardware platform.

Example 45 includes the method of example 37, wherein the threshold error metric corresponds to a numeric level of accuracy achieving a target task on a training dataset.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus comprising:
   interface circuitry to obtain information specific to a target hardware platform (THP) on which a machine learning model is to be executed;
   instructions; and
   at least one processor circuit to be programmed by the instructions to:
      select a first hidden state and a second hidden state for a first layer of the machine learning model;
      select a first operation to apply to the first hidden state based on the information specific to the THP;
      select a second operation to apply to the second hidden state based on the information specific to the THP;
      recursively add one or more additional layers to the machine learning model based on the information specific to the THP until the machine learning model includes a threshold number of layers; and
      cause the interface circuitry to deploy the machine learning model with the threshold number of layers to the THP.

2. The apparatus of claim 1, wherein during training of the machine learning model, the machine learning model is executed on a training hardware platform different than the THP.

3. The apparatus of claim 1, wherein one or more of the at least one processor circuit is to generate slice operations to divide input data to the machine learning model into partitions that correspond to memory requirements of the THP.

4. The apparatus of claim 1, wherein one or more of the at least one processor circuit is to
   select the first hidden state and the second hidden state for the first layer of the machine learning model from a list of hidden states that is to include new hidden states.

5. The apparatus of claim 4, wherein one or more of the at least one processor circuit is to:
   select a third operation to combine the first hidden state and the second hidden state to generate a first one of the new hidden states; and
   execute the third operation after (a) the first hidden state has been operated on in accordance with the first operation and (b) the second hidden state has been operated on in accordance with the second operation.

6. The apparatus of claim 1, wherein the information specific to the THP includes at least one of operators that are conditioned for the THP, kernels that are optimized for the THP, a latency estimator that is specific to the THP, memory capabilities of the THP, or memory bandwidth of the THP.

7. The apparatus of claim 1, wherein the first layer of the machine learning model includes an operator including a kernel that is tuned to the THP.

8. The apparatus of claim 1, wherein one or more of the at least one processor circuit is to cause the interface circuitry to deploy the machine learning model after the machine learning model satisfies a threshold error metric, the threshold error metric corresponding to a numeric level of accuracy achieving a target task on a training dataset.

9. A non-transitory computer-readable medium comprising instructions to cause at least one processor to at least:
   obtain information specific to a target hardware platform (THP) on which a machine learning model is to be executed;
   select a first hidden state and a second hidden state for a first layer of the machine learning model;
   select a first operation to apply to the first hidden state based on information specific to the THP;
   select a second operation to apply to the second hidden state based on the information specific to the THP;
   recursively add one or more additional layers to the machine learning model based on the information specific to the THP until the machine learning model includes a threshold number of layers; and
   cause interface circuitry to deploy the machine learning model with the threshold number of layers to the THP.

10. The non-transitory computer-readable medium of claim 9, wherein the instructions cause one or more of the at least one processor to, during training of the machine learning model, execute the machine learning model, the one or more of the at least one processor different than the THP.

11. The non-transitory computer-readable medium of claim 9, wherein the instructions cause one or more of the at least one processor to generate slice operations to divide input data to the machine learning model into partitions that correspond to memory requirements of the THP.

12. The non-transitory computer-readable medium of claim 9, wherein the instructions cause one or more of the at least one processor to select the first hidden state and the second hidden state for the first layer of the machine learning model from a list of hidden states that is to include new hidden states.

13. The non-transitory computer-readable medium of claim 9, wherein the information specific to the THP includes at least one of operators that are conditioned for the THP, kernels that are optimized for the THP, a latency estimator that is specific to the THP, memory capabilities of the THP, or memory bandwidth of the THP.

14. An apparatus comprising:
   means for processing communications to obtain information specific to a target hardware platform (THP) on which a machine learning model is to be executed;
   means for selecting hidden states to select a first hidden state and a second hidden state for a first layer of the machine learning model;
   means for selecting operations to:
      select a first operation to apply to the first hidden state based on the information specific to the THP; and
      select a second operation to apply to the second hidden state based on the information specific to the THP;
   means for generating layers of the machine learning model to recursively add one or more additional layers to the machine learning model based on the information specific to the THP until the machine learning model includes a threshold number of layers; and
   means for deploying machine learning models to cause the means for processing communications to deploy the machine learning model with the threshold number of layers to the THP.

15. The apparatus of claim 14, wherein during training of the machine learning model, the machine learning model is executed on a training hardware platform different than the THP.

16. The apparatus of claim 14, further including means for partitioning data to generate slice operations to divide input data to the machine learning model into partitions that correspond to memory requirements of the THP.

17. The apparatus of claim 14, wherein the means for selecting hidden states is to
select the first hidden state and the second hidden state for the first layer of the machine learning model from a list of hidden states that is to include new hidden states.

18. A server to distribute first instructions on a network, the server comprising:
at least one storage device including second instructions; and
at least one processor to execute the first instructions and the second instructions to transmit the first instructions over the network, the first instructions to cause at least one device to:
obtain information specific to a target hardware platform (THP) on which a machine learning model is to be executed;
select a first hidden state and a second hidden state for a first layer of the machine learning model;
select a first operation to apply to the first hidden state based on the information specific to the THP;
select a second operation to apply to the second hidden state based on the information specific to the THP;
recursively add one or more additional layers to the machine learning model based on information specific to the THP until the machine learning model includes a threshold number of layers; and
deploy the machine learning model with the threshold number of layers to the THP.

19. The server of claim 18, wherein the first instructions, when executed, cause the at least one device to, during training of the machine learning model, execute the machine learning model, the at least one device different than the THP.

20. The server of claim 18, wherein the first instructions, when executed, cause the at least one device to generate slice operations to divide input data to the machine learning model into partitions that correspond to memory requirements of the THP.

21. The server of claim 18, wherein the first instructions, when executed, cause the at least one device to
select the first hidden state and the second hidden state for the first layer of the machine learning model from a list of hidden states that is to include new hidden states.

* * * * *